Sept. 18, 1951  R. T. CORNELIUS  2,568,114
DISPENSING DEVICE FOR CARBONATED BEVERAGES
Filed Aug. 10, 1944  3 Sheets-Sheet 2

Inventor
Richard T. Cornelius
By Caswell & Lagaard
Attorneys

Sept. 18, 1951  R. T. CORNELIUS  2,568,114
DISPENSING DEVICE FOR CARBONATED BEVERAGES
Filed Aug. 10, 1944  3 Sheets-Sheet 3

Inventor
Richard T. Cornelius
By Caswell & Lagaard
Attorneys

Patented Sept. 18, 1951

2,568,114

UNITED STATES PATENT OFFICE 2,568,114

DISPENSING DEVICE FOR CARBONATED BEVERAGES

Richard T. Cornelius, Minneapolis, Minn.

Application August 10, 1944, Serial No. 548,816

4 Claims. (Cl. 225—21)

My invention relates to dispensing devices for carbonated beverages, and has for an object to provide a device which will serve carbonated beverages under all conditions, with the same amount of carbonization.

Another object of the invention resides in providing a device having a container in which the carbonated beverage is contained and in providing a regulator for regulating the pressure of the gas in the container in accordance with the temperature of the beverage in the container.

Another object of the invention resides in providing a beverage dispensing device in which any amount of carbonization can be produced in the beverage, regardless of the temperature of the beverage in the container.

A feature of the invention resides in constructing the regulator with a pressure responsive valve mechanism connected with a source of carbon dioxide under pressure and in providing a thermally responsive member actuated in accordance with the temperature of the beverage in the container for operating the valve mechanism to control the flow of carbon dioxide to the container.

An object of the invention resides in providing a faucet and a conduit connected with the faucet and delivering a carbonated beverage thereto.

Another object of the invention resides in providing a flow control device for controlling the pressure of the beverage in said conduit at its locality of discharge to prevent foaming and splashing of the beverage upon being dispensed.

An object of the invention resides in constructing said control device with an adjustable flow restrictor and in further providing a pressure responsive operating device responsive to the pressure of the beverage at the locality of said restrictor for operating said flow restrictor.

A still further object of the invention resides in connecting said flow restrictor in said conduit at a locality intermediate the ends thereof to divide said conduit into two sections and in further forming the section between said flow restrictor and faucet of sufficiently small dimensions to form a fixed resistance in said conduit.

Another object of the invention resides in cooling both of the sections of the said conduit.

Other objects of the invention reside in the novel combination and arrangement of parts and in the details of construction hereinafter illustrated and/or described.

Figure 1:
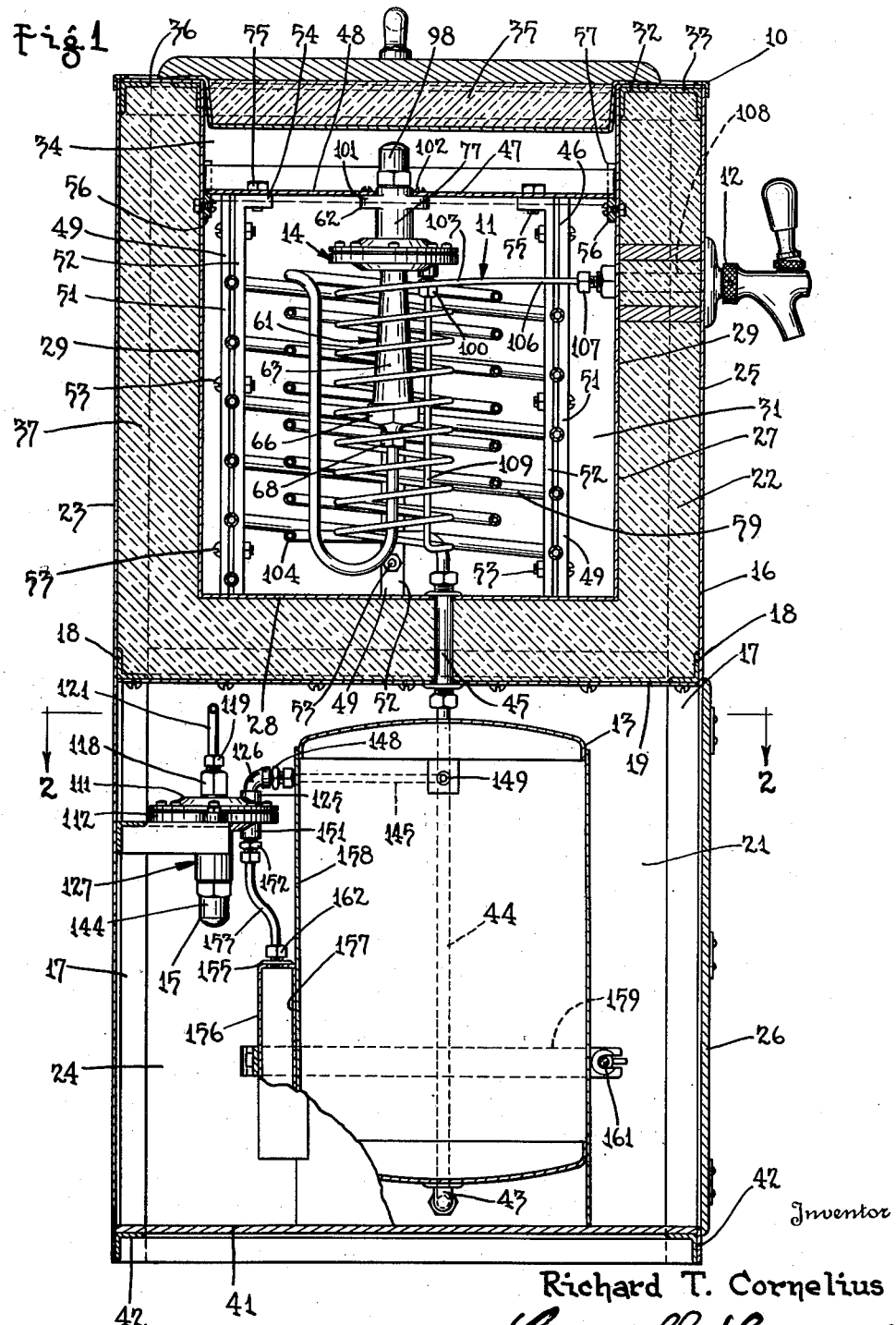
Fig. 1 is an elevational sectional view of a beverage dispensing device illustrating an embodiment of my invention.
Figure 2:
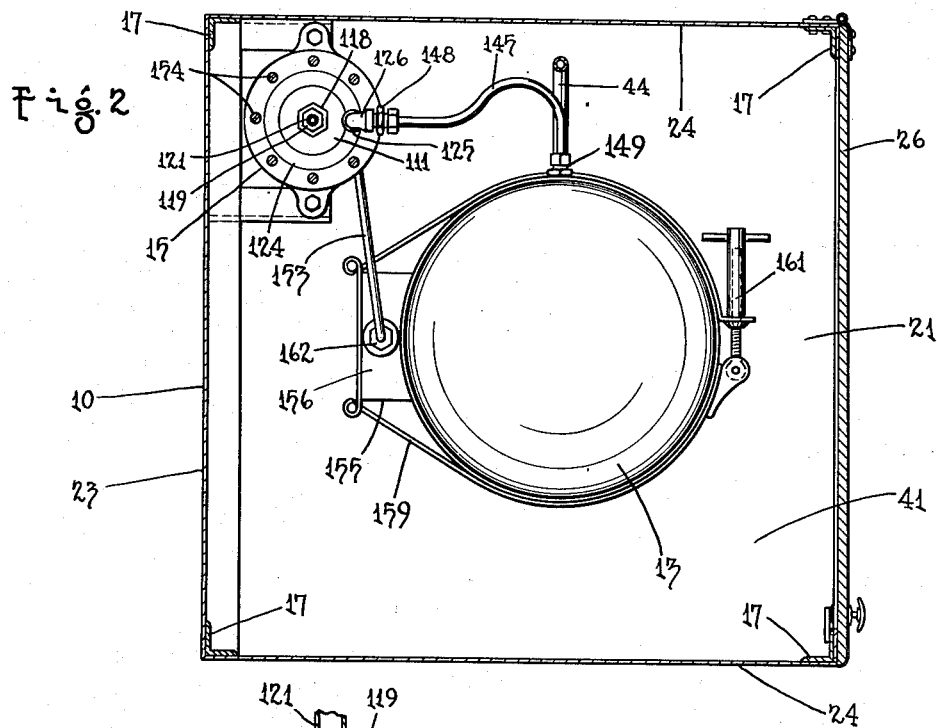
Fig. 2 is a plan sectional view taken on line 2—2 of Fig. 1.

In the dispensing of carbonated beverages where the beverage is dispensed from containers such as barrels, drums or the like, considerable difficulty is encountered due to the fact that the temperature of the container when connected to the dispensing device varies considerably, depending upon the prior place of storage of the container. It is well known that the amount of carbon dioxide held in solution in a liquid depends upon the pressure on the liquid and this pressure, in turn, is dependent upon the temperature of the liquid. The present invention provides a regulator for regulating the amount of carbonization of the beverage and for producing a pressure in the container corresponding with the temperature of the beverage. In the dispensing of the beverage, foaming and splashing occurs if the pressure of the liquid within the faucet is too great. Where the pressure in the container for the beverage would vary, as would be the case if the pressure were varied to produce a certain degree of carbonization, the pressure at the faucet would correspondingly vary. The instant invention provides a control device whereby this pressure may be controlled to cause the beverage to be discharged from the faucet at the same pressure, regardless of the temperature or pressure of the beverage in the container.

My invention comprises a refrigerator 10 having a conduit 11 therein for conducting beverage under pressure to a dispensing faucet 12. The conduit 11 is connected to a container 13 disposed below the refrigerator 10 and from which the beverage under pressure is delivered to the faucet 12. In the conduit 11 is mounted a control device 14 by means of which the pressure of the beverage, on leaving the faucet 12 is automatically maintained constant and at a predetermined low value. Adjacent the container 13 is provided a regulator 15 which maintains a fixed amount of carbonization in the beverage within the container 13, regardless of the temperature therein. These various parts will now be described in detail.

The refrigerator 10 comprises a housing 16 including four uprights 17 at the corners thereof. These uprights have attached to them cross-frame members 18 which support a partition 19. This partition divides the refrigerator into a lower compartment 21 in which the container 13 is disposed and into an upper compartment 22 in which the refrigerating apparatus is disposed. The housing 16 includes a rear wall 23 and side walls 24 extending throughout the entire height thereof. Said housing further includes a front wall 25 which extends down to the partition 19, thus leaving the compartment 21 open from the front of the housing. This compartment is closed by means of a door 26 which is hingedly mounted on one of the uprights 17 in any suitable manner. By means of this construction, access may be had to the interior of the compartment 21 from the front of the housing.

Within the interior of the housing 16 and spaced from the walls thereof is a case 27 which consists of a bottom 28 and lateral walls 29 and 31. This case is supported at its upper end through transverse frame members 32 and 33 which are attached to the uprights 17. The said case provides a refrigerating compartment 34 in which the conduit 11 and the control device 14 are disposed. This compartment is open at the top and may be closed by means of a removable lid or closure 35, resting upon an upper wall 36 of the housing 16 carried by the frame members 32 and 33. The space between the housing 16 and the case 27 is filled with insulating material 37 to retard heat loss from the refrigerator proper.

The lower portion of the housing 16 has mounted in it a bottom 41 which is supported on cross-frame members 42 connected to the uprights 17. Within the compartment 21 is placed the container 13 containing the carbonated beverage to be dispensed. This container rests freely upon the bottom 41 and is inserted into the compartment 21 through the opening closed by the door 26. The said container has a connection 43 at the bottom of the same and to which a flexible conduit 44 may be connected. Such construction being well known in the art, has not been shown in detail in this application. Conduit 44 is connected to a pipe connection 45 which passes through the bottom 28 of case 27 and through the partition 19. This pipe connection is connected within the compartment 21 to the conduit 11 in a manner to be presently more fully described.

Within the compartment 31 in the refrigerator 10 is mounted a rack 46. This rack consists of a transverse frame member 47, channel-shaped in cross-section which is arranged with its web 48 extending horizontally and lowermost. This frame member has attached to it a number of hangers 49, each consisting of spaced clamp members 51 and 52 which are clamped together by means of bolts 53. The clamp member 52 has a lug 54 on it which is attached to the web 48 of channel 47 by means of a cap screw 55. The channel frame member 47 rests upon two lugs 56 which are attached to the walls 29 of the case 27. Guides 57 on these lugs hold the channel frame member 47 in proper position. The hangers 49 support a coil 59 of suitable tubing which is connected to a refrigerator apparatus of any suitable type and by means of which a coolant may be circulated to cool the compartment 31. In use, I prefer to fill the compartment 31 with a heat exchange liquid such as brine or the like, whereby heat exchange between the coil 59 and the conduit 11 may occur.

Figure 4:
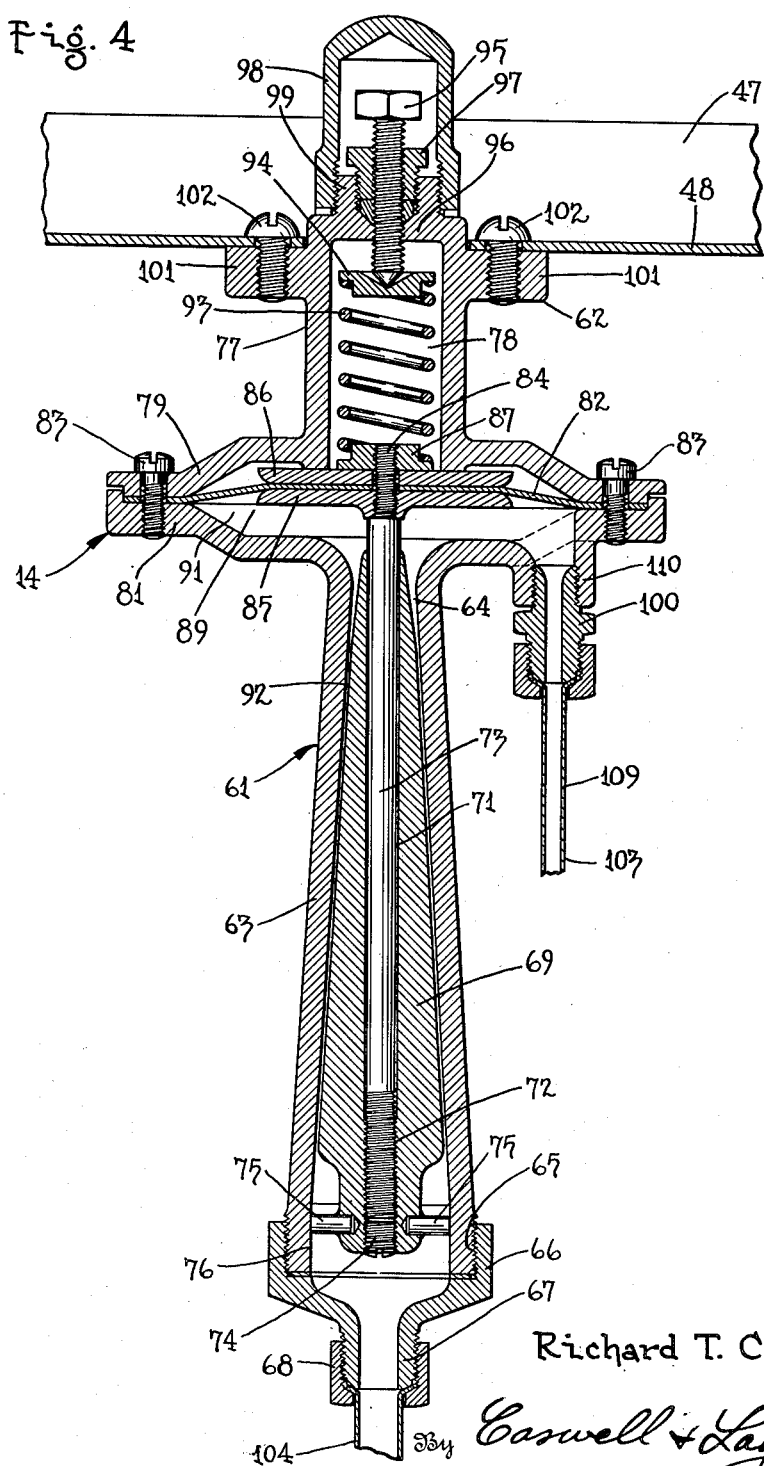
Fig. 4 is an elevational sectional view taken through the flow control device of the invention.

The flow control device 14 is shown in detail in Fig. 4. This control device comprises a flow restrictor 61 and a pressure responsive operating device 62 therefor. These parts will now be described in detail. The flow restrictor 61 consists of a case 63 tubular in form which has a conical bore 64 extending throughout the length of the same. This case is threaded at its lower end as designated at 65, to receive a cap 66 screwed thereon. The cap 66 terminates in a threaded boss 67 to which may be screwed a fitting 68 by means of which the bore 64 may be connected at its lower end to the conduit 11. Within the bore 64 is slidably mounted a conical core 69 conforming in taper to the taper of the bore 64. This core has a cylindrical hole 71 extending throughout its length which is threaded at 72 to receive the lower end of a threaded shank 73. The core 69 may be adjustable axially within the bore 64 by screwing the same on the threaded end of the stem 73. The said core is held in adjusted position on said stem by means of a set screw 74 which is threaded into the extreme end of the threads 72 in said core. The lower end of the core 69 is guided for movement within the bore 64 by means of a number of guide pins 75 which project outwardly from said core and which engage a cylindrical surface 76 formed in the extreme lower end of the case 63. The other end of the stem 73 is guided as will be presently more fully described.

The pressure responsive operating device 62 comprises a case 77 tubular in form at the central portion of the same and providing a tubular chamber 78 at such locality. The said case has at its lower end an outwardly extending cupped flange 79. This flange overlies a correspondingly formed cupped flange 81 on the upper end of the case 63 of flow restrictor 61. Between these flanges is clamped a diaphragm 82. This is accomplished by means of cap screws 83 which extend through the flange 79 and are threaded into the flange 81. The upper end 84 of the stem 73 extends through the diaphragm 82. This portion of the stem is smaller in diameter than the stem proper and supports a backing plate 85 on the lower side of the diaphragm 82. Another backing plate 86 is mounted on the other side of the diaphragm and the entire assembly of parts held together as a unit by means of a nut 87 screwed upon the extreme end of the portion 84 of stem 73. By means of this construction, a piston member 89 is provided which is adapted to move the core 69 as the said piston member operates. The space on the lower side of the diaphragm 82 formed between it and the cup-shaped flange 81 and designated at 91 forms an expansible chamber which communicates with the annular passageway 92 formed between the core 69 and the bore 64 of case 63.

Within the chamber 78 of case 77 is mounted a compression coil spring 93 which bears at one end against the nut 87 of piston member 89. The said spring further engages a head 94 which bears against the lower end of a screw 95 threaded into a portion 96 of the case 77 at the upper end of the same. A gland 97 forms a tight joint between the screw 95 and the case 77. Surrounding the screw 95 and the gland 97 is a cap 98 which is threaded on a boss 99 formed on the case 77. The control device 14 is supported from the channel frame member 47 by means of two lugs 101 which extend outwardly from the same case. Screws 102 pass through the web 48 of the channel 47 and are threaded into these lugs. By means of this construction, the entire control device 14 hangs from the frame member 47 and is disposed below the same.

The conduit 11 is divided into two sections 103 and 104. The section 103 is of considerably smaller diameter than the section 104 and forms a fixed resistance in said conduit whereby the pressure of the carbonated beverage passing into said section becomes materially reduced. This section is wound in the form of a coil which encircles the case 63 of the flow restrictor 61. The discharge end 106 of this coil is connected by means of a connector 107 with the shank 108 of faucet 12, while the inlet end 109 of said coil is connected to a connector 100 which is screwed into a threaded boss 110 on the flange 81 of case 63. By means of this construction, the inlet end 109 of the section 103 of conduit 11 communicates with the chamber 91 within the control device 14.

The section 104 of the conduit 11 is constructed in the form of a coil which is of greater diameter than the diameter of the section 103 and of a lesser diameter than the diameter of the coil 59. This section is disposed within the coil 59 and encircles the section 103. The lower end of the section 104 is connected to the pipe connection 45, while the upper end is connected to the flow restrictor 61 by means of the fitting 68 previously referred to. It will thus be readily comprehended that flow of beverage from the container occurs through the connection 43, conduit 44, pipe connection 45, section 104 of the conduit 11, the annular passageway 92 in the flow restrictor 61 and into the chamber 91. From chamber 91, the beverage flows through the section 103 of the conduit 11 and into and through the faucet 12.

Figure 3:
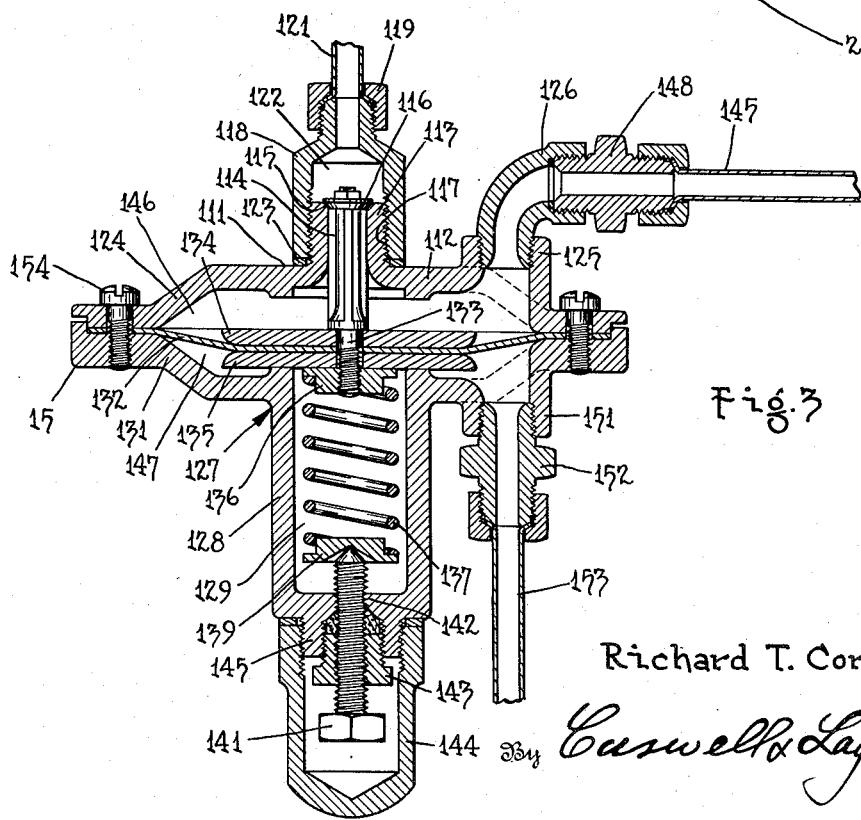
Fig. 3 is an elevational sectional view taken through the regulator of the invention.

The regulator 15 is shown in detail in Fig. 3 and includes a valve mechanism indicated in its entirety by the reference numeral 111. This valve mechanism includes a case 112 formed with a boss 113 extending upwardly therefrom. In the boss 113 is slidably mounted a fluted valve stem 114. At the upper end of the boss 13 is formed a valve seat 115. A valve head 116, mounted on the stem 114, engages the said valve seat and closes the valve. The boss 113 is externally threaded at 117 to receive a threaded cap 118 which has attached to it a tube fitting 119. By means of this tube fitting, a tube 121 is connected to the cap 118 and communicates with the chamber 112 above the valve head 116. This tube may be connected to any suitable supply of carbon dioxide under pressure which has not been shown in the drawings. The cap 118 bears against a gasket 123, so as to form a fluid-tight connection with the case 112. The case 112 includes an offset flange 124 which is formed near its periphery with an internally threaded boss 125. This boss has an elbow 126 screwed into the same.

The regulator 15 further includes a pressure responsive operating device indicated at 127 which serves to operate the valve mechanism 111. This device includes a tubular case 128 having a chamber 129 within the same. Said case is formed with an offset flange 131 corresponding with the flange 124 of case 112 and overlying the same. Disposed between the flanges 124 and 131 is a diaphragm 132 which is clamped in position between said diaphragms by means of screws 154 which pass through the flange 124 and are screwed into the flange 131. The valve stem 114 is formed with a reduced threaded end 133 which extends through the diaphragm 132. Two backing plates 134 and 135, mounted on the end 133 of stem 114 are disposed one on each side of the diaphragm 132. This entire structure is held assembled by means of a nut 136 screwed on the end 133 of stem 114.

The valve mechanism 111 is normally held open by means of a compression coil spring 137 mounted in the chamber 129 of case 128 and bearing at one end against the nut 136. The other end of this spring bears against a head 139 which bears against the upper end of a screw 141 threaded into a portion 142 of the case 128 at the lower end of the same. A gland 143 forms a tight joint between the screw 141 and the case 128. Surrounding the screw 141 and the gland 143 is a cap 144 which is threaded on a boss 145 formed on the case 128.

The diaphragm 132 forms in conjunction with the two flanges 124 and 131 two compartments 146 and 147 within the regulator 15 and on opposite sides of said diaphragm. The compartment 146 communicates with the chamber 122 through the valve mechanism 111 and also with the interior of the elbow 126. Elbow 126 has a tube connection 148 attached thereto and to which is connected a flexible tube 145 also connected to the container 42 near the upper end thereof as indicated at 149. The flange 131 is formed with a threaded boss 151 which receives a tube connection 152. A flexible tube 153 is connected to this tube connection and communicates with the chamber 147.

The valve operating mechanism 127 is actuated by means of a thermally responsive member, best illustrated in Fig. 1 and designated by the reference numeral 155. This thermally responsive member comprises a receptacle 156 which has a wall 157 arcuate in form and adapted to fit about and to contact the outer surface of the cylindrical wall 158 of container 13. A split hoop 159, provided at its ends with a quick release clamping device 161, encircles the container 13 and the receptacle 156. When the clamping device 161 is operated, the hoop 159 is tensioned and the surfaces of the arcuate wall 157 of receptacle 156 and the wall 158 of container 13 are urged into close contact with one another to procure efficient heat exchange therebetween. The interior of the receptacle 156 is filled with a suitable fluid which is adapted to expand upon the heating of the same. The receptacle 155 is connected by means of a tube connection 162 with the flexible tube 153, previously referred to. It will thus be seen that the pressure within the receptacle 156 is transmitted to the chamber 147 and exerts a pressure on the diaphragm 132. This pressure is less than the pressure exerted by the gas in the container 13, the diaphragm 132 on its other side being subjected to this latter pressure. As the temperature of the beverage within the container 13 rises, the pressure within the upper portion of the said container must be increased accordingly to maintain the same amount of carbon dioxide dissolved in the beverage. I preferably employ a fluid in the receptacle 156 whose temperature-pressure curve is substantially the same as that for a saturated solution of carbon dioxide in the beverage to be dispensed. I have found that sulphur dioxide is a fluid substantially meeting these requirements.

The operation of my invention is as follows:

A container filled with carbonated beverage is inserted into the compartment 21 in refrigerator 10 and the thermally responsive member 155 attached to the said container by means of hoop 159 and the clamp 161. The flexible tube 153 and the hose 44 are next connected to the container by means of the connections provided therefor. A suitable coolant is circulated through the coil 59 and the temperature of the circulating medium within the chamber 31 is brought down to the proper temperature. The regulator 127 is next regulated through the screw 141 to give the proper percentage of gas in the beverage. If, for example, a carbonization of 3½ volumes of gas to one volume of beverage are desired, the screw 141 would be adjusted to cause the regulator to produce this amount of carbonization. At 70° F., it would take 46 pounds of pressure to maintain the gas in the solution. If this were the temperature of the beverage when inserted into the dispensing device, the pressure on the upper side of the diaphragm 132 would be 46 pounds per square inch. At the same time, the pressure on the under side of the diaphragm would be pressure exerted by the spring 137 and the pressure exerted by the fluid in the receptacle 156. This would naturally have to balance the pressure on the upper side of the diaphragm and when this occurred, no flow of gas into the container 42 would occur. If, after the device had been in the dispensing device for a certain period of time and the temperature thereof had raised, then the pressure necessary to maintain 3½ volumes of carbon dioxide in solution would have to be increased. Assume that the temperature now became 100° F. A pressure of 78 pounds would now be necessary to keep 3½ volumes of the gas in solution. Under such conditions, the pressure exerted by the fluid in the receptacle 156 would increase and the valve head 116 would be raised by diaphragm 132 to allow carbon dioxide from the tube 121 to pass through the valve mechanism 111 and into the chamber 146. Flow of carbon dioxide would occur until the pressure were again equalized and the valve head 116 brought to bear upon the seat 115. If the temperature of the beverage within the container 42 were to drop, so as to require less pressure in said container, such condition would be met when the beverage was drawn from the faucet. After a few glasses of beverage had been drawn, the pressure would drop sufficiently to meet the requirements, thus making it unnecessary to relieve the pressure in the device. It can, however, be readily comprehended that a regulator similar to that shown in Fig. 3 may be used to discharge gas from the container 13, until the proper relation between pressure and temperature has been established. Due to the fact that the pressure-temperature curve of the fluid in the receptacle 156 is substantially the same as that required to maintain the desired carbonization in the beverage, the regulator 15 will operate to at all times maintain the desired amount of carbonization in the beverage.

The beverage, on entering the conduit 11 and flowing through the sections 104 and 103 thereof, becomes cooled to the desired temperature. Due to the high pressure in the container 13, the beverage could not be dispensed at this pressure without causing undue foaming and splashing. By means of the resistance afforded through the section of the conduit 11 and through the resistance afforded in the annular passageway 92 of the flow restrictor 61, the beverage leaves the faucet 12 at a suitable pressure to produce the desired amount of foam and to prevent unnecessary agitation and splashing. It will readily be comprehended that since the pressure in the container 13 varies with the temperature of the beverage, that a fixed resistance between the container and the faucet would not produce uniform results. For this reason, the adjustable resistance afforded by the flow restrictor 61, as previously brought out, functions in conjunction with the resistance in the conduit 11 to maintain a uniform discharge pressure at the faucet.

The advantages of my invention are manifest. The beverage container may be inserted directly into the dispensing device without pre-cooling. The regulator controls the amount of carbon dioxide admitted to the container, so that the desired degree of saturation is at all times maintained. With my invention, carbonated beverages can be drawn from the faucet with the same degree of carbonization and at the same pressure, regardless of the condition of the beverage in the container. The device is automatic in operation and simple in construction and operates in a positive and practical manner to produce the desired results.

Changes in the specific form of my invention, as herein described, may be made within the scope of what is claimed without departing from the spirit of my invention.

Having described my invention, what I claim as new and desire to protect by Letters Patent is:

1. In combination, a faucet, a conduit for delivering a carbonated beverage under pressure to said faucet, a fixed flow restrictor in said conduit adjoining said faucet, an adjustable flow restrictor in said conduit adjacent said fixed flow restrictor and a pressure responsive operating device connected to said adjustable flow restrictor and varying the resistance offered thereby to the flow of carbonated beverage inversely as the pressure of the beverage in said conduit at a locality between said restrictors.

2. In combination, a faucet, a conduit for delivering a carbonated beverage under pressure to said faucet, an adjustable flow restrictor connected in said conduit intermediate the ends thereof to divide the said conduit into two sections, the bore of the section between the restrictor and faucet being of sufficiently small diameter to form a fixed resistance in said conduit and a pressure responsive operating device responsive to the pressure at the locality between said restrictor and fixed resistance for adjusting said restrictor.

3. In combination, a faucet, a conduit for delivering a carbonated beverage under pressure to said faucet, an adjustable flow restrictor connected in said conduit intermediate the ends thereof to divide the said conduit into two sections, the bore of the section between the restrictor and faucet being of sufficiently small diameter to form a fixed resistance in said conduit, a pressure responsive operating device responsive to the pressure at the locality between said restrictor and fixed resistance for adjusting said restrictor, and means for cooling both of the sections of said conduit.

4. In a flow control device for controlling the flow of a carbonated liquid to a faucet, an adjustable flow restrictor including a case having an elongated conical bore of a length greater than its minimum diameter and an elongated conical core member substantially uniformly spaced from the wall formed by the bore and slidable in said bore to vary the cross sectional area of the passageway therebetween, means forming an inlet to said flow restrictor and adapted to be connected to a container containing the liquid under pressure, means forming an outlet to said flow restrictor and adapted to be connected to a faucet, a piston member connected to said core member, means enclosing said piston member and forming an expansible chamber and subject to the pressure of the liquid at said outlet, said piston, upon increase in the pressure at the outlet, moving said core member in a manner to reduce the cross sectional area of the passageway between said case and core member.

RICHARD T. CORNELIUS.

REFERENCES CITED

The following references are of record in the file of this patent:

UNITED STATES PATENTS

| Number | Name | Date |
| --- | --- | --- |
| 2,046,032 | Muller | June 30, 1936 |
| 2,085,848 | Cornelius | July 6, 1937 |
| 2,199,661 | Gambel et al. | May 7, 1940 |
| 2,237,215 | Coney | Apr. 1, 1941 |
| 2,320,969 | Kromer et al. | June 1, 1943 |
| 2,327,444 | Nigbor | Aug. 24, 1943 |